United States Patent
Kobayashi et al.

(10) Patent No.: US 10,247,250 B2
(45) Date of Patent: Apr. 2, 2019

(54) FIXED TYPE CONSTANT VELOCITY UNIVERSAL JOINT

(71) Applicants: Tomoshige Kobayashi, Shizuoka (JP); Kouji Masuoka, Shizuoka (JP)

(72) Inventors: Tomoshige Kobayashi, Shizuoka (JP); Kouji Masuoka, Shizuoka (JP)

(73) Assignee: NTN CORPORATION, Osaka (JP)

( * ) Notice: Subject to any disclaimer, the term of this patent is extended or adjusted under 35 U.S.C. 154(b) by 265 days.

(21) Appl. No.: 15/035,052

(22) PCT Filed: Oct. 22, 2014

(86) PCT No.: PCT/JP2014/078094
§ 371 (c)(1),
(2) Date: May 6, 2016

(87) PCT Pub. No.: WO2015/076051
PCT Pub. Date: May 28, 2015

(65) Prior Publication Data
US 2016/0281790 A1   Sep. 29, 2016

(30) Foreign Application Priority Data
Nov. 22, 2013   (JP) ................. 2013-241896

(51) Int. Cl.
*F16D 3/224*  (2011.01)
*F16D 3/223*  (2011.01)
*F16D 3/2237*  (2011.01)

(52) U.S. Cl.
CPC .......... *F16D 3/223* (2013.01); *F16D 3/2237* (2013.01); *B23P 2700/11* (2013.01);
(Continued)

(58) Field of Classification Search
CPC ............... F16D 3/223; F16D 3/2237; F16D 2250/0023; F16D 2003/22309;
(Continued)

(56) References Cited

U.S. PATENT DOCUMENTS 4,319,465 A * 3/1982 Ito .................... F16D 3/2245
   464/145
5,509,857 A   4/1996 Flaugher
(Continued)

FOREIGN PATENT DOCUMENTS

DE    1 284 706    12/1968
EP    0 661 475    7/1995
(Continued)

OTHER PUBLICATIONS

International Search Report dated Jan. 20, 2015 in International (PCT) Application No. PCT/JP2014/078094.
(Continued)

*Primary Examiner* — Greg Binda
(74) *Attorney, Agent, or Firm* — Wenderoth, Lind & Ponack, L.L.P.

(57) ABSTRACT

An outer joint member includes a cutout portion that is formed at least at each corner portion on an opening side of a cup section, which is defined between a radially inner opening end portion of each of track grooves and a radially inner spherical surface portion formed between the track grooves. The cutout portion is configured to prevent a cage from interfering with the outer joint member when the cage is incorporated into the outer joint member. The cutout portion and the track grooves of the outer joint member are finished by cold-forging ironing using a single ironing punch.

10 Claims, 13 Drawing Sheets

(52) U.S. Cl.
CPC .............. *F16D 2003/22303* (2013.01); *F16D 2003/22309* (2013.01); *F16D 2250/0023* (2013.01); *Y10S 464/906* (2013.01)

(58) Field of Classification Search
CPC ....... F16D 2003/22303; Y10S 464/906; B23P 2700/11
USPC ........................................................ 464/145
See application file for complete search history.

(56) References Cited

U.S. PATENT DOCUMENTS

| | | | | |
|---|---|---|---|---|
| 5,788,578 | A | * | 8/1998 | Shimizu ................. B21K 1/762 |
| | | | | 464/145 |
| 6,135,891 | A | | 10/2000 | Sone et al. |
| 8,684,850 | B2 | * | 4/2014 | Terasaka ............... F16D 3/2237 |
| | | | | 464/145 |
| 2002/0115492 | A1 | | 8/2002 | Jacob |
| 2011/0059804 | A1 | | 3/2011 | Yamazaki et al. |
| 2011/0269556 | A1 | | 11/2011 | Kobayashi et al. |
| 2012/0220382 | A1 | | 8/2012 | Sone et al. |

FOREIGN PATENT DOCUMENTS

| | | | | |
|---|---|---|---|---|
| EP | | 2 299 134 | 3/2011 | |
| EP | | 2 505 863 | 10/2012 | |
| JP | | 55-126124 | 9/1980 | |
| JP | | 55-126124 A | * 9/1980 | ................... 464/145 |
| JP | | 11-101256 | 4/1999 | |
| JP | | 11-236925 | 8/1999 | |
| JP | | 2001-323945 | 11/2001 | |
| JP | | 2007-64322 | 3/2007 | |
| JP | | 2008-2624 | 1/2008 | |
| JP | | 2009-185929 | 8/2009 | |
| JP | | 2009-264535 | 11/2009 | |
| JP | | 2010-164106 | 7/2010 | |
| WO | | 2011/065400 | 6/2011 | |
| WO | WO | 2011/125491 A1 | * 10/2011 | |

OTHER PUBLICATIONS

English translation of International Preliminary Report on Patentability and Written Opinion of International Searching Authority dated May 24, 2016 in corresponding International Application No. PCT/JP2014/078094.
Extended European Search Report dated Jul. 3, 2017 in counterpart European Patent Application No. 14864502.1.

* cited by examiner

FIXED TYPE CONSTANT VELOCITY UNIVERSAL JOINT

TECHNICAL FIELD

The present invention relates to a fixed type constant velocity universal joint, and more particularly, to a fixed type constant velocity universal joint to be used for a drive shaft or a propeller shaft of an automobile.

BACKGROUND ART

FIG. 14 is an illustration of a fixed type constant velocity universal joint. The fixed type constant velocity universal joint is of an undercut-free type, and includes an outer joint member 3 including a cup section 10 having a plurality of track grooves 2 formed in a radially inner surface 1 thereof, an inner joint member 6 having a plurality of track grooves 5 formed in a radially outer surface 4 thereof and paired with the track grooves 2 of the outer joint member 3, a plurality of balls 7, which are interposed between the track grooves 2 of the outer joint member 3 and the track grooves 5 of the inner joint member 6, and are configured to transmit torque therebetween, and a cage 8, which is interposed between the radially inner surface 1 of the outer joint member 3 and the radially outer surface 4 of the inner joint member 6, and is configured to retain the balls 7. In the cage 8, a plurality of window portions 9 configured to accommodate the balls 7 therein are formed along a circumferential direction.

In the fixed type constant velocity universal joint, a groove bottom of each of the track grooves 2 of the outer joint member 3 includes a straight portion 2a (linear portion parallel to an axial direction of the outer joint member) on an opening side, and a circular-arc portion 2b on a deep side. A groove bottom of each of the track grooves 5 of the inner joint member 6 includes a circular-arc portion 5a on an opening portion side, and a straight portion 5b (linear portion parallel to an axial direction of the inner joint member 6) on the deep side. In this case, a center O1 of the track grooves 2 of the outer joint member 3 and a center O2 of the track grooves 5 of the inner joint member 6 are axially offset to opposite sides with respect to a joint center O by equal distances f and f.

In general, the outer joint member of the constant velocity universal joint is manufactured by the method as follows. First, a columnar billet is formed by hot forging, warm forging, or cold forging into a schematic shape of the outer joint member, and then subjected to a turning process into an arbitrary shape. After that, the processed product is subjected to heat treatment, and the inner spherical surface and the track grooves are subjected to a finishing process such as grinding and quenched-steel cutting.

The finishing process performed on the track grooves after forging, turning, and heat treatment as described above involves increase in cost of equipment and tools required for the finishing process on the track grooves. Moreover, time periods are required for the finishing process, thereby causing inconvenience that a material yield is lowered. Accordingly, in the related-art methods, the track grooves of the outer joint member are formed by cold-forging finishing (Patent Literature 1 and Patent Literature 2). Further, for example, the track grooves, radially inner spherical surface portions, a cup-inlet chamfer, track chamfers, and track-inlet chamfers of the outer joint member may be finished by cold forging (Patent Literature 3).

The track grooves of the outer joint member are formed by cold-forging finishing, thereby being capable of omitting various types of machining such as cutting work and grinding that are performed after cold forging in the related art. As a result, the yield is increased, thereby being capable of reducing cost of the constant velocity universal joint.

Incidentally, for the cost reduction, a weight of a product may be reduced by downsizing the constant velocity universal joint. However, when assembling components (particularly when incorporating the cage into the outer joint member), the cage has been incorporated under a condition that an inlet diameter of the cup section of the outer joint member is set larger than an outermost diameter of a hole portion of a cage window.

For the downsizing of the constant velocity universal joint, it is also necessary to downsize interior components (such as the inner joint member, the cage, and the balls) arranged inside the cup section of the outer joint member. However, it is necessary to keep torque bearing capacity.

Inside the constant velocity universal joint, load is transmitted in the order of the inner joint member, the balls, and the outer joint member, and in the order of the outer joint member, the balls, and the inner joint member. However, when a ball pitch circle diameter (PCD) of the constant velocity universal joint is reduced along with downsizing thereof, the load on the inner joint member, the outer joint member, and the balls is increased as compared to that on the related-art product. Accordingly, the constant velocity universal joint is designed, for example, in such a manner that a ball diameter is increased in order to disperse the load, thereby equalizing a contact surface pressure between the balls and the inner joint member or the outer joint member to that on the related-art product. Further, the same consideration is also given to a shape of the cage configured to accommodate the balls therein.

However, even when the shape is optimized by the design, depending on the ball diameter, the ball PCD, and the cage shape, as illustrated in FIG. 15 to FIG. 17, the cage 8 or the like may not be easily incorporated into the outer joint member 3.

That is, when the cage 8 is incorporated into the outer joint member 3, first, as illustrated in FIG. 16 and FIG. 17, the cage 8 is inserted into the radially inner surface 1 of the outer joint member 3 under a state in which the cage 8 is turned by 90° about a Y axis. Then, after the cage 8 is pushed into a bottom portion of the cup section 10 of the outer joint member 3, the cage 8 is turned by 90° about the Y axis, to thereby be arranged in a normal posture. Here, the Y axis refers to an axis orthogonal to an X axis corresponding to a center axis of the outer joint member 3.

However, when the cage 8 is inserted into the outer joint member 3 as illustrated in FIG. 16 and FIG. 17, an edge 12 (see FIG. 15) of a cage axial end portion (side surface portion) of each pocket (window portion) of the cage 8 may interfere with a radially inner opening portion (track chamfer) 13 of each of the track grooves 2 as illustrated in FIG. 17.

In the related art, a chamfered portion is formed at a boundary portion between a radially inner spherical surface portion of the outer joint member and a radially inner surface of a mouth opening portion. In this manner, incorporation of the cage into the outer joint member is facilitated (Patent Literature 4). In this case, the chamfered portion prevents a burr and the like from being generated on the boundary portion, thereby preventing the boundary portion from being formed into an angular shape. Further, in order to increase workability of incorporation of the balls, a cut portion has been formed in an end portion of each of the track grooves that are open to an inlet tapered portion of the cup section (Patent Literature 5 and Patent Literature 6).

CITATION LIST

Patent Literature 1: JP 2008-2624 A
Patent Literature 2: JP 11-236925 A
Patent Literature 3: JP 2009-185929 A
Patent Literature 4: JP 2007-64322 A
Patent Literature 5: JP 11-101256 A
Patent Literature 6: JP 2001-323945 A

SUMMARY OF INVENTION

Technical Problem

The method described in Patent Literature 4 prevents a burr and the like from being generated on the boundary portion, thereby preventing the boundary portion from being formed into an angular shape. Accordingly, a state illustrated in FIG. 15 (state in which the cage interferes with the track chamfers 13 of the track grooves 2) cannot be prevented. Further, even the methods described in Patent Literature 5 and Patent Literature 6 cannot prevent the state illustrated in FIG. 15. As described above, the methods described in Patent Literature 1 to Patent Literature 6 cannot solve the problem in that the constant velocity universal joint is brought into the state illustrated in FIG. 15 when the cage is incorporated into the outer joint member.

Thus, in this case, as a method of preventing the state illustrated in FIG. 15, there can be proposed a method of forming the track chamfers 13 on the opening side of the outer joint member by turning, thereby forming cage incorporating chamfers. However, when the turning is performed, a step of processing the cage incorporating chamfers is added to steps of manufacturing the outer joint member. Consequently, productivity is reduced, and turning cost is added. Further, even when the track grooves and the like are finished by forging, accuracy of the track grooves is deteriorated when the turning is performed. Consequently, it is necessary to process the track grooves again.

The present invention has been made in view of the above-mentioned problems, and proposes a fixed type constant velocity universal joint that is capable of forming cage incorporating chamfers at low cost without performing turning, and of simultaneously ensuring excellent durability by forming track grooves with high accuracy by cold-forging finishing, and comprises an outer joint member involving the same forging die and the same product quality control as those of the related-art product.

Solution to Problem

According to one embodiment of the present invention, there is provided a fixed type constant velocity universal joint, comprising: an outer joint member comprising a cup section having a plurality of track grooves formed in a radially inner surface thereof; an inner joint member having a plurality of track grooves formed in a radially outer surface thereof; a plurality of torque transmitting balls, which are interposed between the plurality of track grooves of the outer joint member and the plurality of track grooves of the inner joint member, and are configured to transmit torque therebetween; and a cage, which is interposed between the radially inner surface of the outer joint member and the radially outer surface of the inner joint member, the cage comprising pockets configured to retain the plurality of torque transmitting balls therein, the outer joint member further comprising a cutout portion that is formed at least at each corner portion on an opening side of the cup section, which is defined between a radially inner opening end portion of each of the plurality of track grooves and a radially inner spherical surface portion formed between the plurality of track grooves, the cutout portion being configured to prevent the cage from interfering with the outer joint member when the cage is incorporated into the outer joint member, the cutout portion and the plurality of track grooves of the outer joint member being finished by cold-forging ironing using a single ironing punch.

The fixed type constant velocity universal joint according to the present invention comprises the cutout portion that is formed at least at each corner portion on the opening side of the cup section, which is defined between the radially inner opening end portion of each of the track grooves and the radially inner spherical surface portion formed between the track grooves, and is configured to prevent the cage from interfering with the outer joint member when the cage is incorporated into the outer joint member. Accordingly, when incorporating the cage, interference between the cage and the outer joint member can be prevented. As a result, workability of incorporation can be increased.

In addition, the cutout portion is finished together with the track grooves of the outer joint member by cold-forging ironing. Thus, after the cutout portion is formed, it is not necessary to finish the track grooves again.

The cutout portion may be formed into a round shape, and a connecting portion formed between the cutout portion and the each of the plurality of track grooves may be formed into a round shape. When the cutout portion or the connecting portion is formed into the round shape, stress concentration on the cutout portion or the connecting portion can be avoided.

The fixed type constant velocity universal joint may further comprise a track chamfer formed at a boundary portion between the each of the plurality of track grooves and the radially inner spherical surface portion formed between the plurality of track grooves of the outer joint member. The track chamfer and the each of the plurality of track grooves may be continuously formed through intermediation of the connecting portion having the round shape.

Further, the fixed type constant velocity universal joint may further comprise: a cup-inlet chamfer formed along an entire periphery of an opening portion of the cup section; and a track-inlet chamfer formed at a boundary portion between the each of the plurality of track grooves and the cup-inlet chamfer. The cup-inlet chamfer and the track-inlet chamfer may be formed by cold-forging finishing.

In addition, the fixed type constant velocity universal joint may further comprise: a cup-inlet chamfer formed along an entire periphery of an opening portion of the cup section; and a track-inlet chamfer formed at a boundary portion between the each of the plurality of track grooves and the cup-inlet chamfer. The plurality of track grooves and the track-inlet chamfer may be formed by cold-forging finishing.

The fixed type constant velocity universal joint may be a fixed type undercut-free constant velocity universal joint, in which a bottom surface of the each of the plurality of track grooves of the outer joint member and a bottom surface of the each of the plurality of track grooves of the inner joint member each comprise a circular-arc portion and a straight portion.

It is preferred that the number of the torque transmitting balls be equal to or smaller than ten.

Advantageous Effects of Invention

According to the fixed type constant velocity universal joint of the present invention, when incorporating the cage, interference between the cage and the outer joint member can be prevented. As a result, workability of incorporation can be increased, thereby being capable of increasing productivity. Further, after the cutout portions are formed, it is not necessary to finish the track grooves again. Consequently, it is possible to achieve reduction of production cost and reduction of production time. The cutout portions and the track grooves are finished by cold-forging ironing using the single ironing punch, thereby being capable of providing uniform products (outer joint members) with high accuracy.

The cutout portions or the connecting portions are each formed into a round shape. Thus, stress concentration on the cutout portions or the connecting portions can be avoided, thereby being capable of effectively preventing damage and the like.

The inlet chamfer of the outer joint member, and the track chamfer, the track-inlet chamfer, and the like of the outer joint member are finished by cold forging, thereby being capable of omitting cutting work, grinding, and the like, which are performed after cold forging in the related art. Thus, a yield can be increased, thereby being capable of reducing manufacturing cost of the fixed type constant velocity universal joint.

In particular, the track grooves and the track-inlet chamfer of the outer joint member are formed by simultaneous cold-forging finishing, or the track grooves and the track chamfer of the outer joint member are formed by simultaneous cold-forging finishing. In this manner, productivity can be increased.

It is only necessary that the number of torque transmitting balls be equal to or smaller than ten. Thus, a degree of design freedom is high, and excellent design flexibility is attained. Further, the present invention is applicable to a variety of fixed type constant velocity universal joints.

DESCRIPTION OF EMBODIMENTS

Now, description is made of embodiments of the present invention with reference to the drawings.

Figure 2:
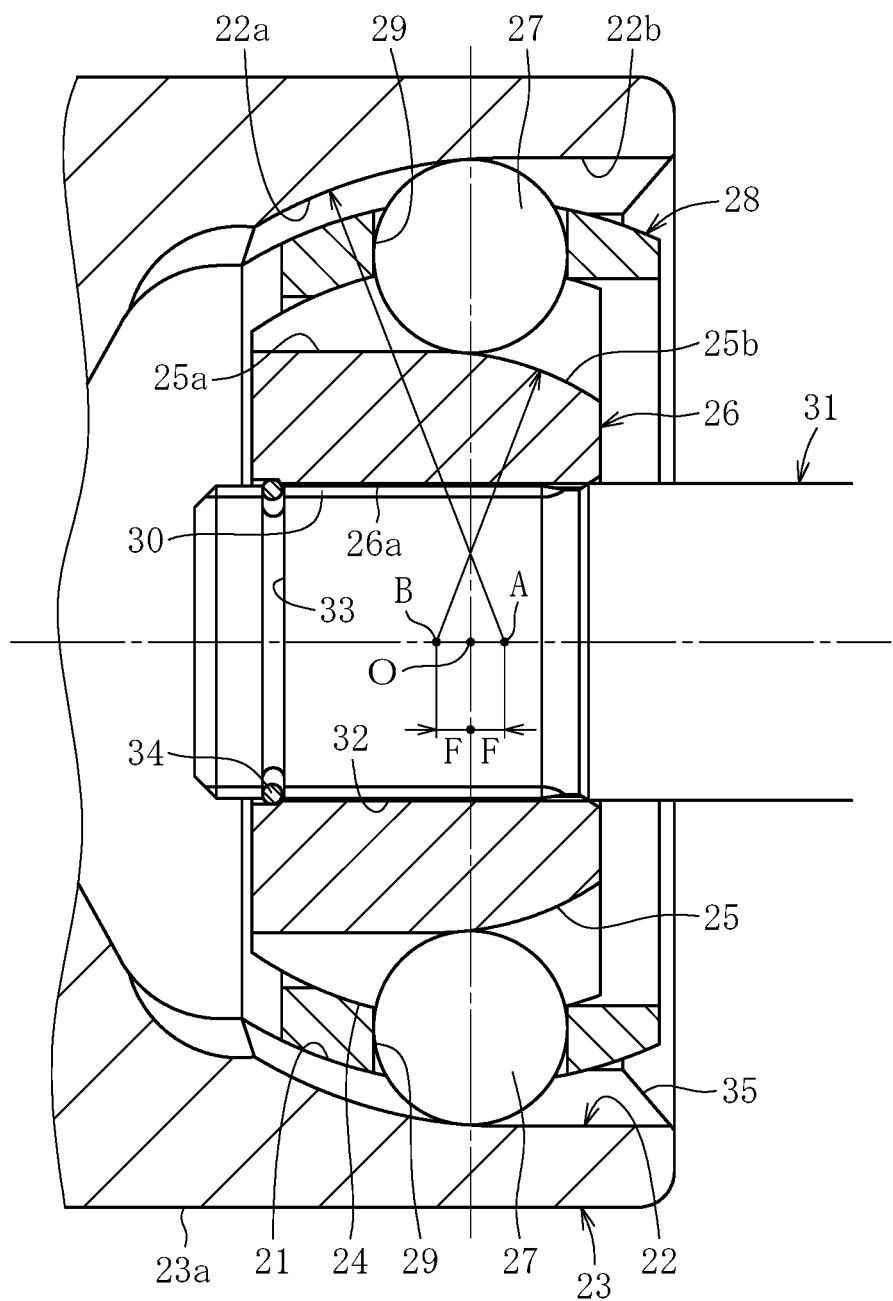
FIG. 2 is a longitudinal sectional view of a main part of the fixed type constant velocity universal joint according to the embodiment of the present invention adopting the outer joint member illustrated in FIG. 1.

FIG. 2 is an illustration of a fixed type undercut-free constant velocity universal joint, which is a fixed type constant velocity universal joint of the present invention. The fixed type constant velocity universal joint comprises an outer joint member 23 having a radially inner surface 21 in which a plurality of track grooves 22 are formed, an inner joint member 26 having a radially outer surface 24 in which a plurality of track grooves 25 are formed in pairs with the track grooves 22 of the outer joint member 23, a plurality of balls 27, which are interposed between the track grooves 22 of the outer joint member 23 and the track grooves 25 of the inner joint member 26, and are configured to transmit torque therebetween, and a cage 28, which is interposed between the radially inner surface 21 of the outer joint member 23 and the radially outer surface 24 of the inner joint member 26, and is configured to retain the balls 27. A plurality of pockets 29 configured to accommodate the balls 27 are arranged along a circumferential direction of the cage 28.

A deep side and an opening side of each of the track grooves 22 of the outer joint member 23 are respectively formed as a circular-arc portion 22a and a linear portion 22b. A deep side and an opening side of each of the track grooves 25 of the inner joint member 26 are respectively formed as a linear portion 25a and a circular-arc portion 25b. Note that, the outer joint member 23 comprises a cup section 23a having the radially inner surface 21 in which the track grooves 22 are formed, and comprises a shaft section (not shown) protruded from a bottom wall of the cup section 23a.

A female spline portion 30 is formed in a radially inner surface of a hole portion of the inner joint member 26. That is, an end portion of a shaft 31 is fitted into a hole portion 26a of the inner joint member 26, and a male spline portion 32 formed in the end portion of the shaft is meshed with the female spline portion 30 of the inner joint member 26. Note that, a circumferential groove 33 is formed in the end portion of the shaft 31, and a stopper ring 34 is mounted into the circumferential groove 33.

As illustrated in FIG. 2, a curvature center B of the track grooves 25 of the inner joint member 26 and a curvature center A of the track grooves 22 of the outer joint member 23 are axially offset in opposite directions with respect to a joint center O by equal distances F and F. In this case, the curvature center A of the track grooves 22 of the outer joint member 23 and the curvature center B of the track grooves 25 of the inner joint member 26 are axially offset to opposite sides by equal distances so that the curvature center A and the curvature center B are respectively offset to a joint opening side and a joint deep side with respect to the joint center O.

Figure 3:
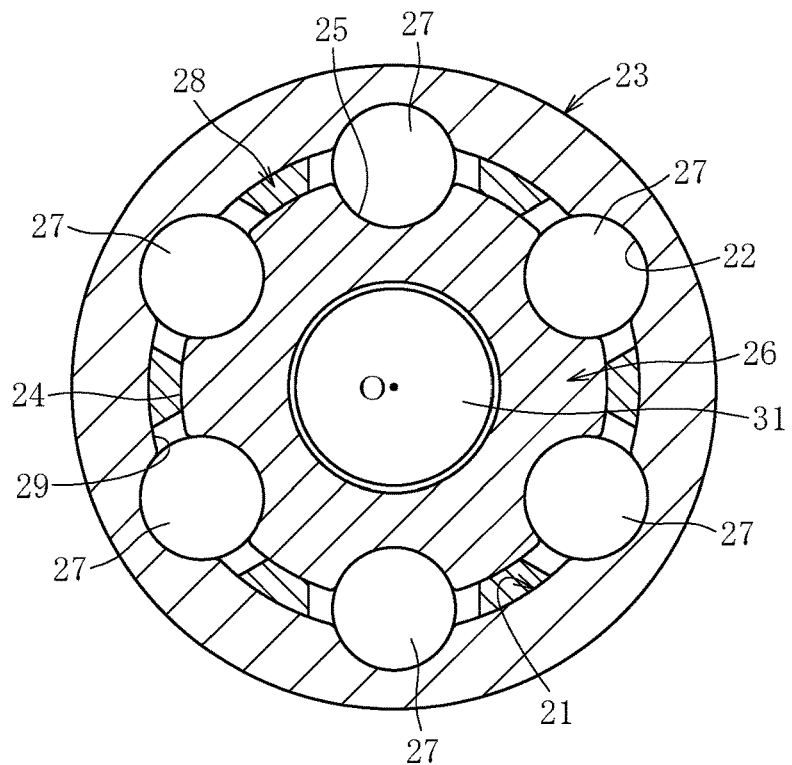
FIG. 3 is a transverse sectional view of a main part of the fixed type constant velocity universal joint illustrated in FIG. 2.

Further, as illustrated in FIG. 3, six track grooves 22 of the outer joint member 23 are formed along a circumferential direction at predetermined pitches (60-degree pitches in this case). Similarly, six track grooves 25 of the inner joint member 26 are formed along the circumferential direction at predetermined pitches (60-degree pitches in this case). Accordingly, six balls 27 serving as torque transmitting members are arranged along the circumferential direction at equal pitches (60-degree pitches). In this case, it is preferred that the number of the balls 27 be equal to or smaller than ten. That is, it is preferred that the number of the track grooves 22 of the outer joint member 23 and the number of the track grooves 25 of the inner joint member 26 be equal to or smaller than ten.

Figure 1:
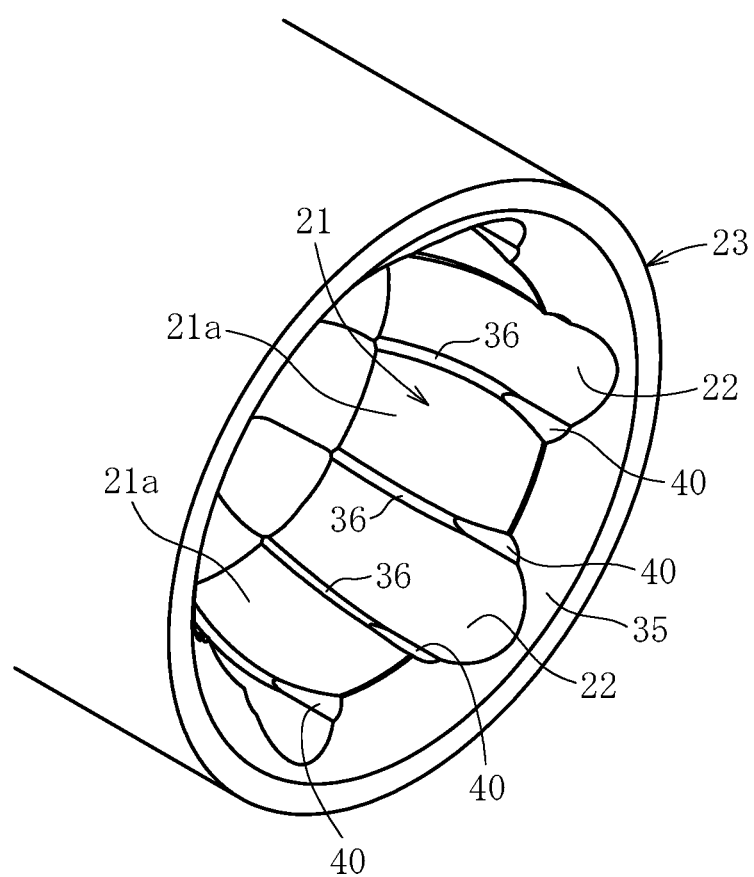
FIG. 1 is a perspective view of a main part of an outer joint member of a fixed type constant velocity universal joint according to an embodiment of the present invention.
Figure 7:
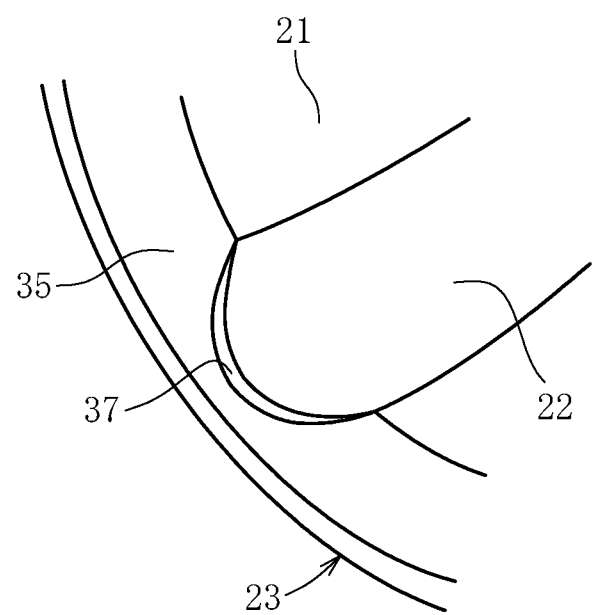
FIG. 7 is a perspective view of a track-inlet chamfer.

As illustrated in FIG. 1, an inlet chamfer (cup-inlet chamfer) 35 is formed along an entire periphery of an opening rim of the outer joint member 23, and a track chamfer 36 is formed at each boundary portion between a radially inner spherical surface portion 21a and the track groove 22. Note that, as illustrated in FIG. 7, a track-inlet chamfer 37 may be formed at each boundary portion between the track groove 22 and the cup-inlet chamfer 35. Further, although not shown, in the inner joint member 26, a track chamfer is formed at each boundary portion between a radially outer spherical surface portion 24a of the radially outer surface 24 and the track groove 25.

As illustrated in FIG. 1, in an opening portion of the outer joint member of the constant velocity universal joint, at each corner portion on the opening side of the cup section, which is defined between a radially inner opening end portion of the track groove 22 and the radially inner spherical surface portion 21a, there is formed a cutout portion (cage incorporating chamfer) 40 configured to prevent the cage 28 from interfering with the outer joint member when the cage 28 is incorporated into the outer joint member. That is, the cutout portion 40 is formed on the joint opening side of the track chamfer 36. Note that, the cutout portion 40 is formed into a convex round shape, and an opening side of the cutout portion 40 is more widely cut out.

Figure 4:
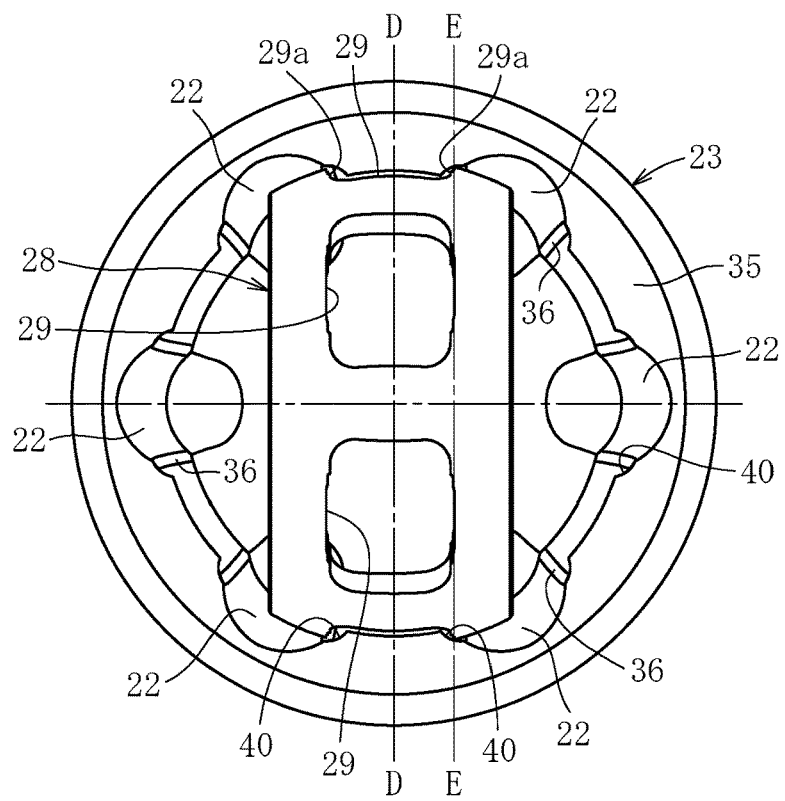
FIG. 4 is a front view for illustrating a step of incorporating a cage into the outer joint member.
Figure 5:
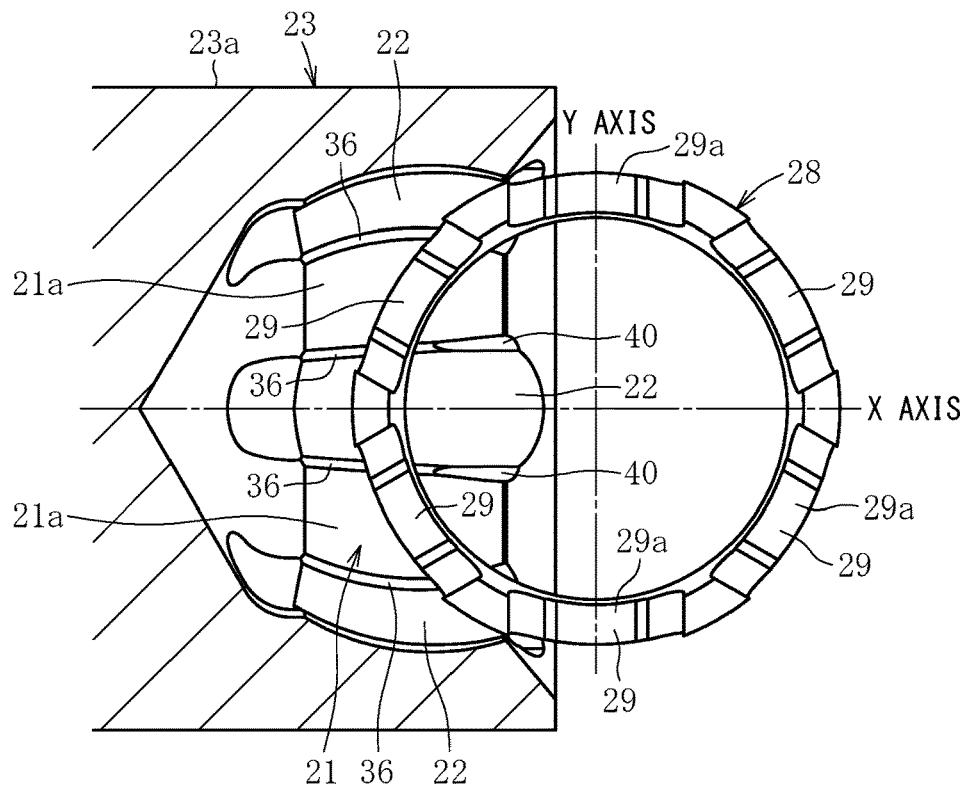
FIG. 5 is a sectional view taken along the line D-D of FIG. 4.
Figure 6:
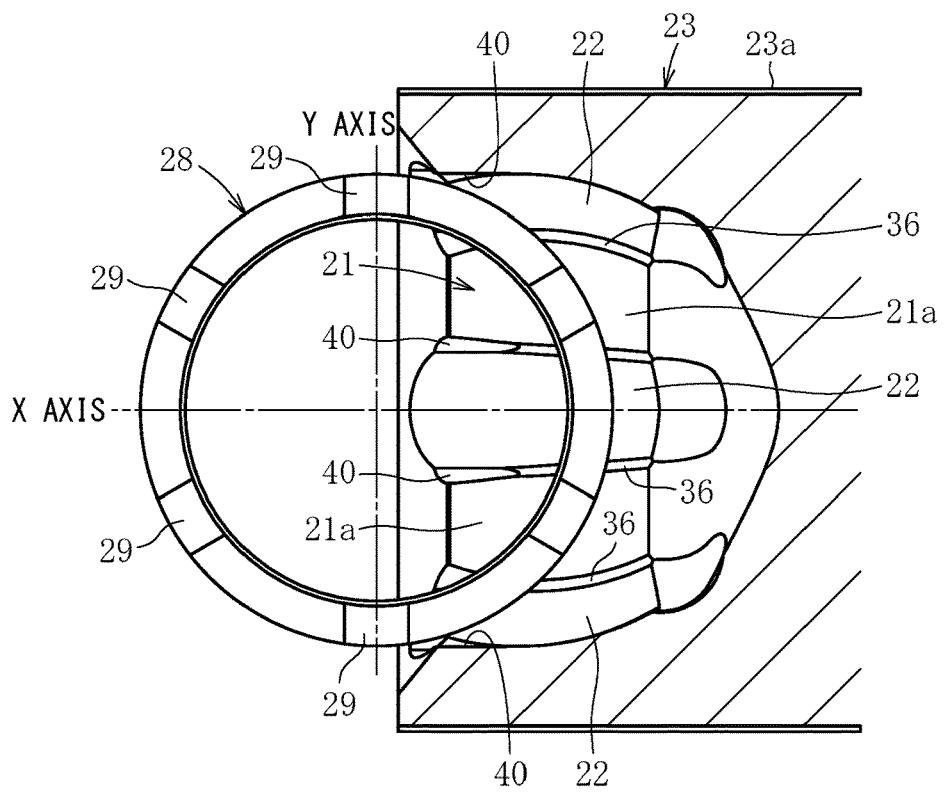
FIG. 6 is a sectional view taken along the line E-E of FIG. 4.

Next, description is made of a method of incorporating the cage 28 into the outer joint member 23 constructed as described above. First, as illustrated in FIG. 4 to FIG. 6, the cage 28 is inserted into the radially inner surface 21 of the outer joint member 23 under a state in which the cage 28 is turned by 90° about a Y axis. Then, after the cage 28 is pushed into a bottom portion of the cup section 23a of the outer joint member 23, the cage 28 is turned by 90° about the Y axis, to thereby be arranged in a normal posture. Here, the Y axis refers to an axis orthogonal to an X axis corresponding to a center axis of the outer joint member 23.

When the cage 28 is inserted into the outer joint member 23 as illustrated in FIG. 5 and FIG. 6, as illustrated in FIG. 4, under a state in which a pair of pockets 29 of the cage 28, which are arranged on 180-degree opposite sides with respect to the center axis, are fitted to the pair of radially inner spherical surface portions 21a arranged on 180-degree opposite sides with respect to the center axis of the outer joint member 23, long-side edge portions 29a and 29a of each of the pockets 29 of the cage 28 are matched with the cutout portions 40. In this manner, without interfering with the outer joint member 23, the cage 28 can be pushed into the bottom portion of the cup section 23a.

Incidentally, the outer joint member 23 is made of, for example, carbon steel for machine construction. It is preferred that the carbon steel for machine construction have a carbon content of from 0.37 wt % or more to 0.61 wt % or less, more preferably a carbon content of from 0.50 wt % or more to 0.58 wt % or less. Specifically, the outer joint member 23 is made of S40C to S58C, desirably S53C to S55C specified in Japanese Industrial Standards (JIS).

The track grooves 22, the inlet chamfer (cup-inlet chamfer) 35, the track chamfers 36, and the track-inlet chamfers (see FIG. 7) are formed in the outer joint member 23 by cold forging. Cold forging can be performed on the outer joint member by an existing manufacturing apparatus (such as a manufacturing apparatus described in JP 2009-185933 A).

Figure 8:
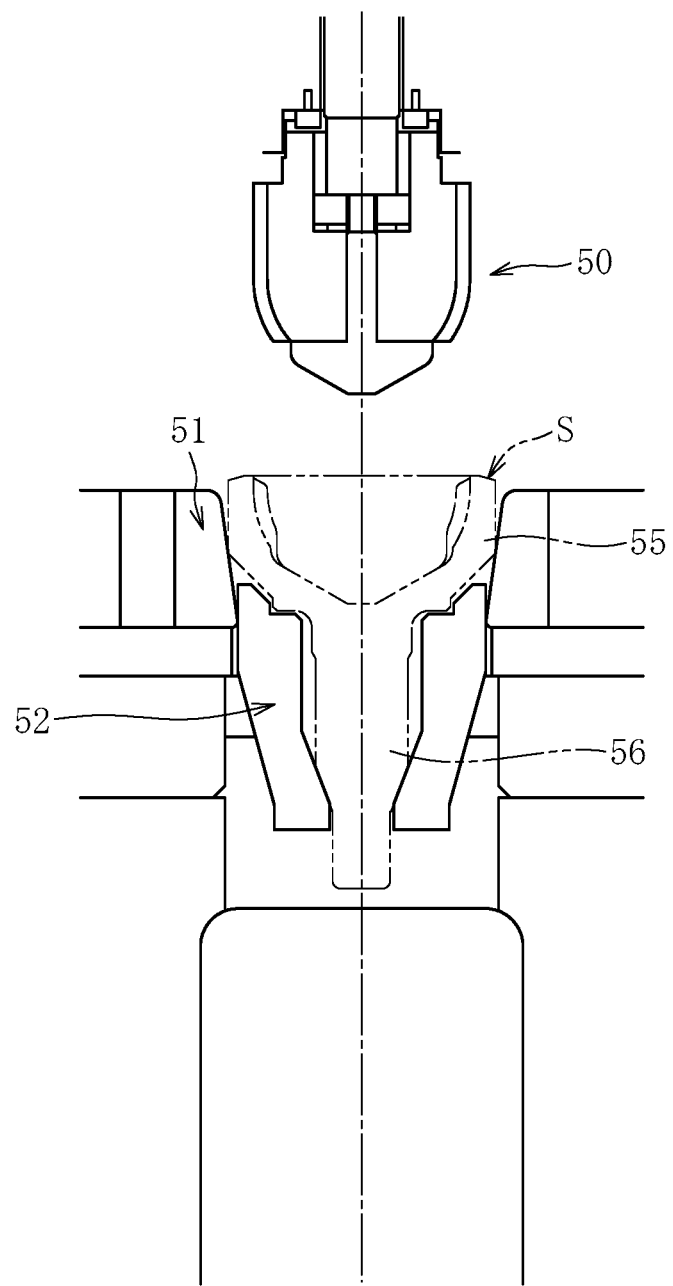
FIG. 8 is a schematic view of a main part of a forging apparatus.

However, the track grooves 22 and the cutout portions 40 are finished by cold-forging ironing using a single ironing punch 50 as illustrated in FIG. 8, whereas the inlet chamfer (cup-inlet chamfer) 35, the track chamfers 36, and the track-inlet chamfers 37 are finished by cold forging using the existing manufacturing apparatus.

That is, a forging apparatus illustrated in FIG. 8 comprises outer diameter dies 51 and 52, and the ironing punch 50, and is configured to finish, by cold forging, a pre-forged product S finished by cold forging using the existing manufacturing apparatus (member before finishing the track grooves 22 and the cutout portions 40 by cold forging). The pre-forged product S comprises a cup section 55 constructing the cup section 23a of the outer joint member 23, and a stem section 56 constructing a stem section of the outer joint member 23.

Accordingly, ironing is performed using the ironing punch 50 under a state in which the cup section 55 is fitted to the outer diameter die 51 and the stem section 56 is fitted into the outer diameter die 52. As the ironing punch 50, a punch illustrated in FIG. 9 and FIG. 10 may be used. The ironing punch 50 comprises track-groove forming portions 57, radially-inner-spherical-surface-portion forming portions 58, cutout-portion forming portions 59, and connecting-portion forming portions 60 formed in a radially outer surface thereof.

Figure 9:
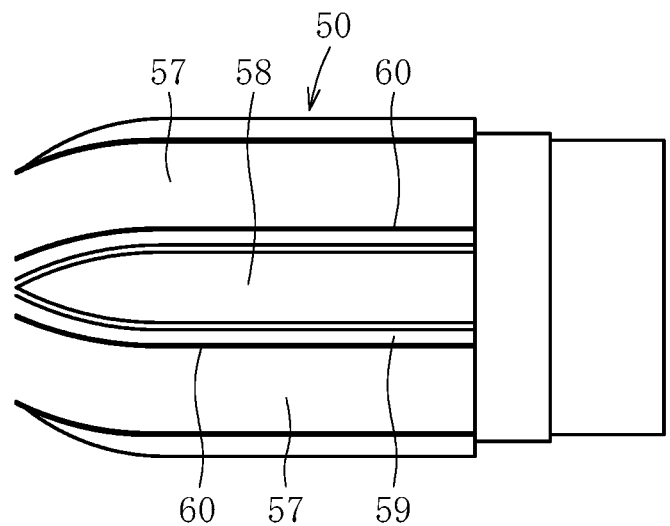
FIG. 9 is a side view of an ironing punch of the forging apparatus.
Figure 10:
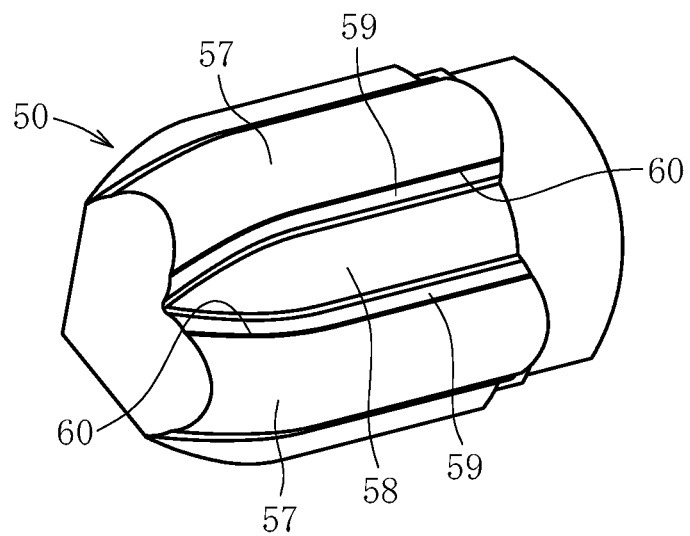
FIG. 10 is a perspective view of the ironing punch of the forging apparatus.
Figure 11A:
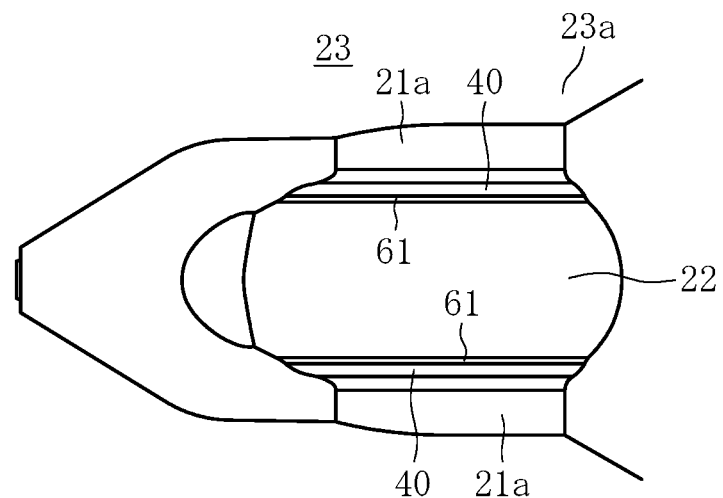
FIG. 11A is an end view of track grooves when viewed from a radially inner side, for illustrating the outer joint member having a radially inner surface in which the track grooves, cage incorporating chamfers (cutout portions) extending along entire lengths of the track grooves, and connecting portions are formed.
Figure 11B:
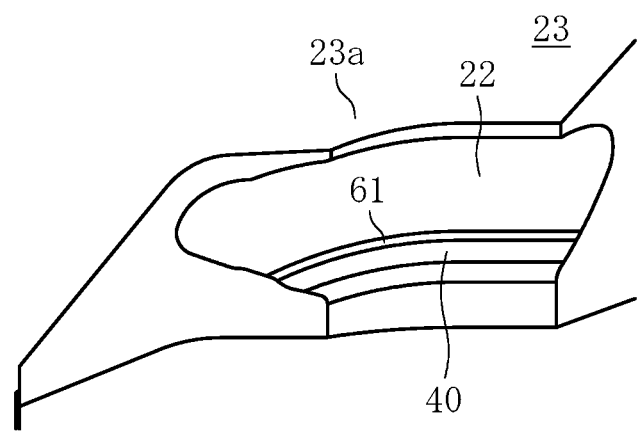
FIG. 11B is a perspective view of the track grooves when viewed from the radially inner side, for illustrating the outer joint member having the radially inner surface in which the track grooves, the cage incorporating chamfers (cutout portions) extending along the entire lengths of the track grooves, and the connecting portions are formed.

Incidentally, using the ironing punch 50 illustrated in FIG. 9 and FIG. 10, each cage incorporating chamfer being the cutout portion 40 is formed along substantially an entire length of the track groove 22 in a longitudinal direction of the track groove 22 as illustrated in FIG. 11A and FIG. 11B. Further, each connecting portion 61 is formed between the track groove 22 and the cage incorporating chamfer (cutout portion 40). The connecting portion 61 is formed into a round shape. Accordingly, at the time of completion of ironing forging, an interior shape of the cup section 23a of the outer joint member 23 exhibits a shape illustrated in FIG. 11A and FIG. 11B.

Figure 12A:
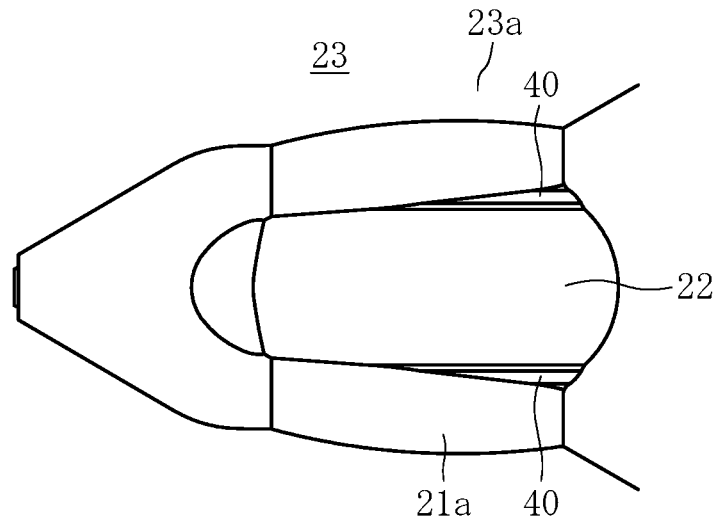
FIG. 12A is an end view of the track grooves when viewed from the radially inner side, for illustrating the outer joint member having the radially inner surface in which the cage incorporating chamfers (cutout portions) are formed on the joint opening portion side.
Figure 12B:
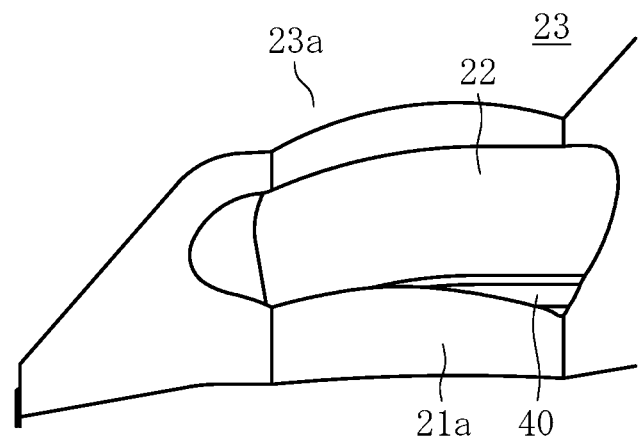
FIG. 12B is a perspective view of the track grooves when viewed from the radially inner side, for illustrating the outer joint member having the radially inner surface in which the cage incorporating chamfers (cutout portions) are formed on the joint opening portion side.

FIG. 12A and FIG. 12B are illustrations of a shape obtained by forming the radially inner spherical surface portions 21a by turning after the shape illustrated in FIG. 11A and FIG. 11B is obtained in such a manner that the track grooves 22 and the cutout portions 40 are finished by ironing. In this case, as illustrated in FIG. 1, each of the cutout portions 40 is formed only on the opening portion side of the cup section 23a.

Figure 13A:
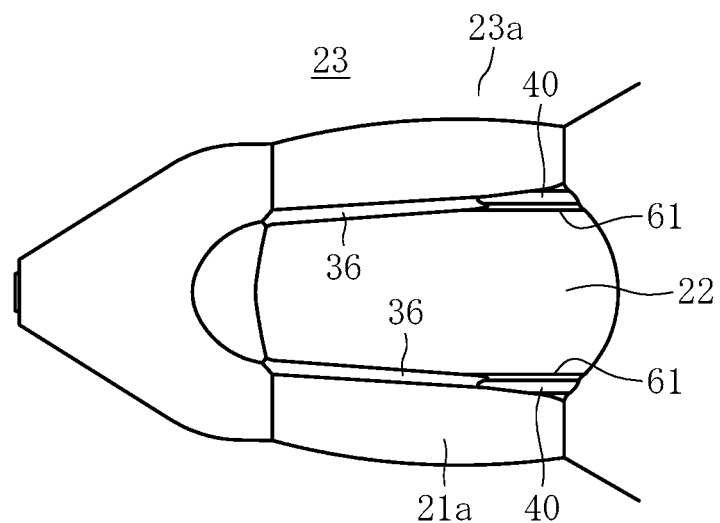
FIG. 13A is an end view of the track grooves when viewed from the radially inner side, for illustrating the outer joint member having the radially inner surface in which the track grooves, the cage incorporating chamfers (cutout portions), and the connecting portions are formed.
Figure 13B:
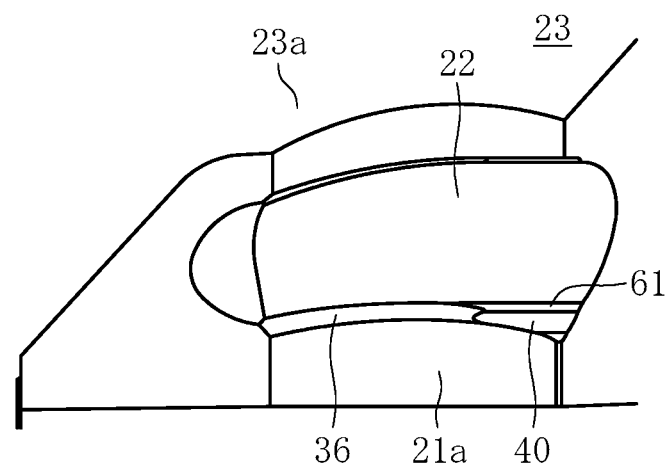
FIG. 13B is a perspective view of the track grooves when viewed from the radially inner side, for illustrating the outer joint member having the radially inner surface in which the track grooves, the cage incorporating chamfers (cutout portions), and the connecting portions are formed.
Figure 14:
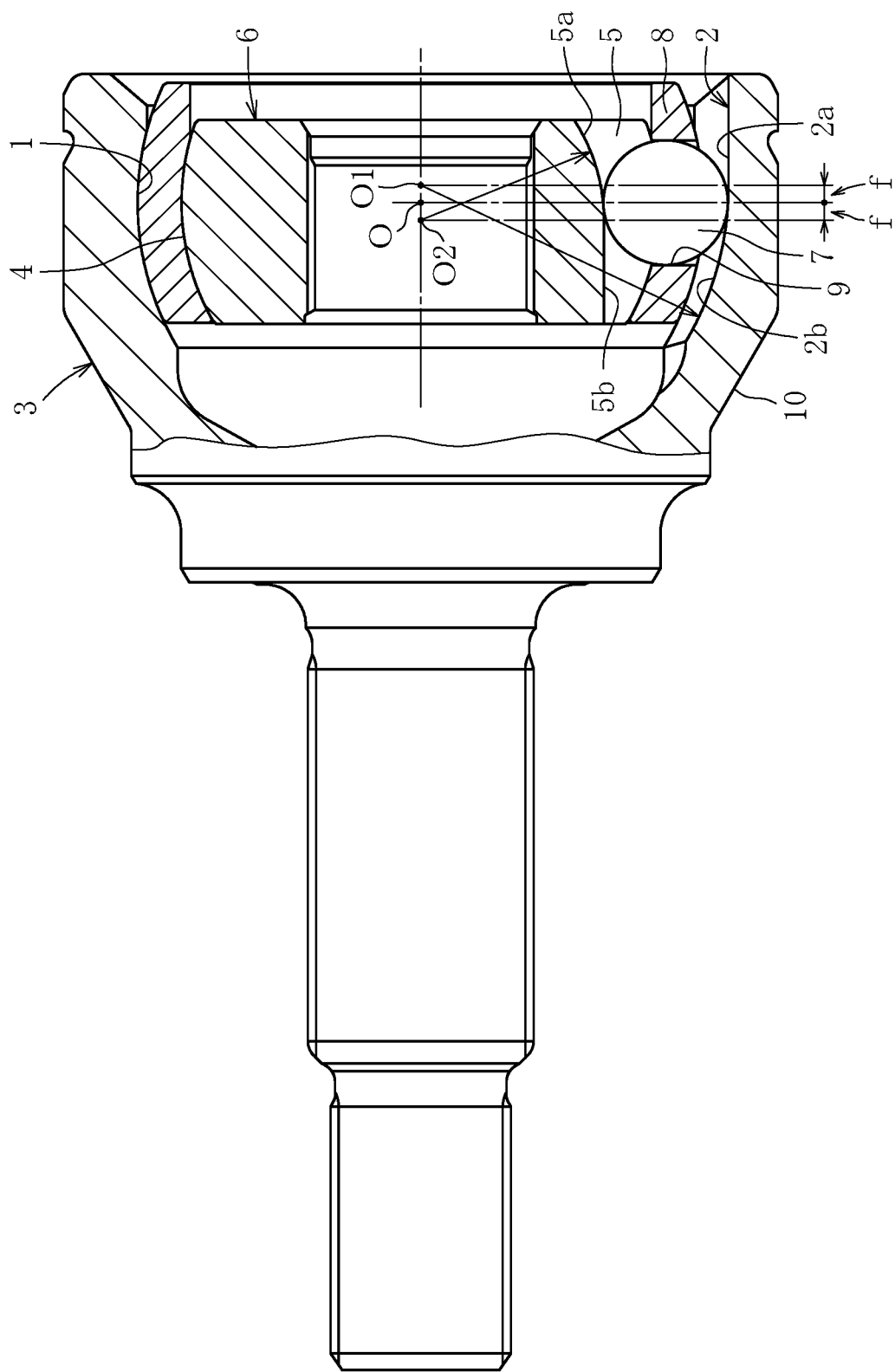
FIG. 14 is a sectional view of a related-art fixed type undercut-free constant velocity universal joint.
Figure 15:
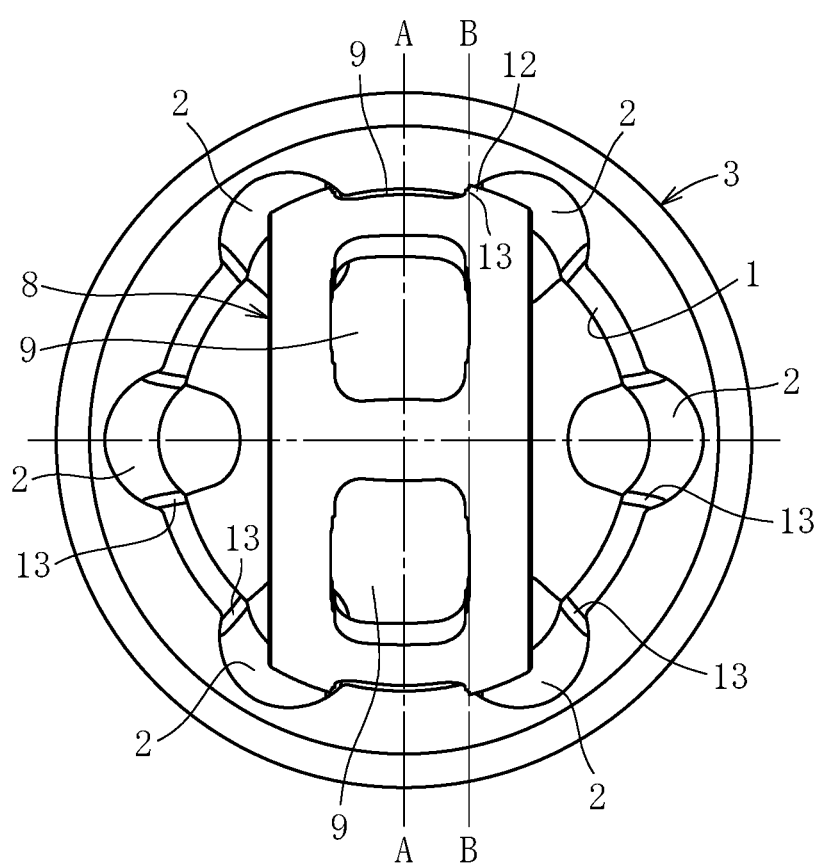
FIG. 15 is a front view for illustrating a step of incorporating a cage into an outer joint member of the related-art fixed type constant velocity universal joint.
Figure 16:
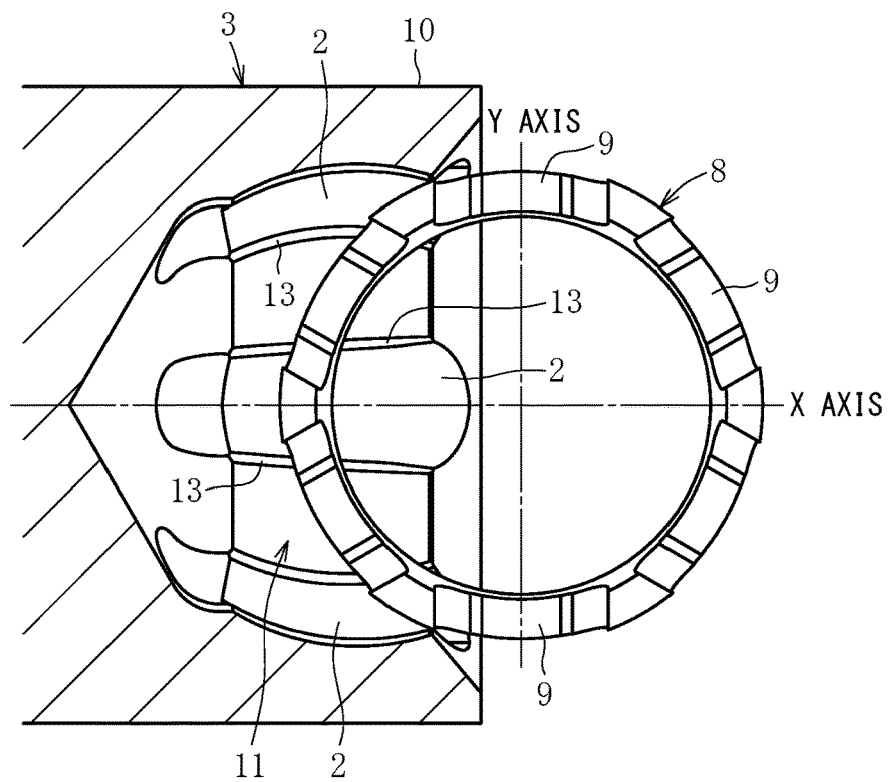
FIG. 16 is a sectional view taken along the line A-A of FIG. 15.
Figure 17:
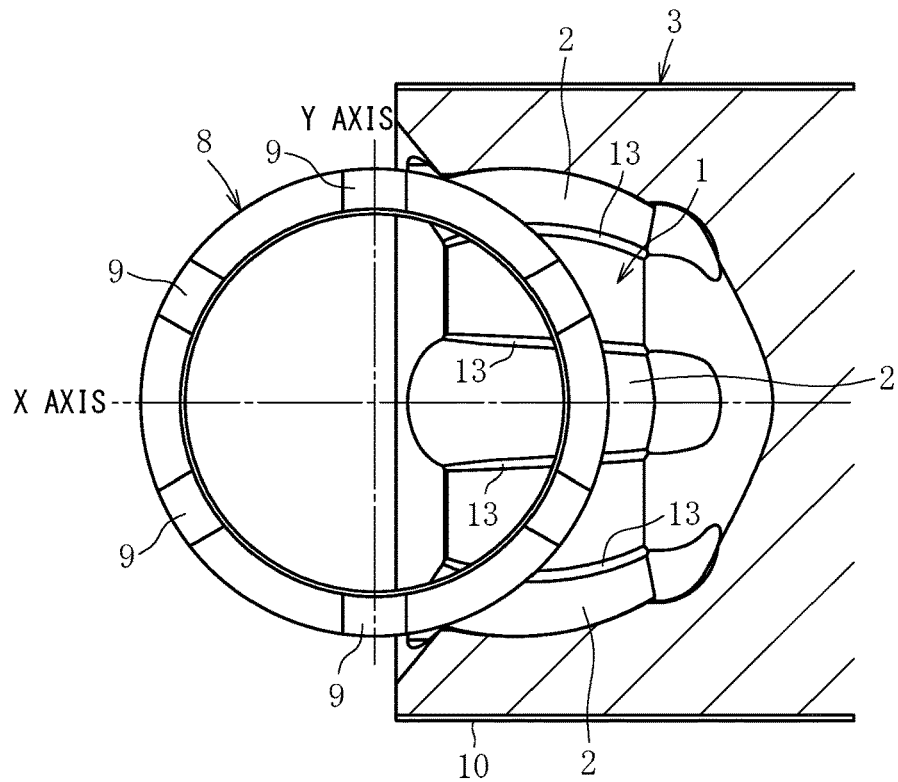
FIG. 17 is a sectional view taken along the line B-B of FIG. 15.

FIG. 13A and FIG. 13B are illustrations of a shape obtained by forming the track chamfers 36 by turning after the shape illustrated in FIG. 12A and FIG. 12B is obtained in such a manner that the track grooves 22 and the cutout portions 40 are finished by ironing and then the radially inner spherical surface portions 21a are formed by turning. Also in this case, as illustrated in FIG. 1, each of the cutout portions 40 is formed only on the opening portion side of the cup section 23a.

The cutout portion 40, which is configured to prevent the cage 28 from interfering with the outer joint member 23 when incorporating the cage 28, is formed at least at each corner portion on the opening side of the cup section, which is defined between the radially inner opening end portion of each of the track grooves and the radially inner spherical surface portion 21a formed between the track grooves 22. Accordingly, when incorporating the cage 28, interference between the cage 28 and the outer joint member 23 can be prevented. As a result, workability of incorporation can be increased, thereby being capable of increasing productivity.

In addition, the cutout portions 40 are finished together with the track grooves 22 of the outer joint member 23 by cold-forging ironing. Thus, after the cutout portions 40 are formed, it is not necessary to finish the track grooves 22 again. Consequently, it is possible to achieve reduction of production cost and reduction of production time. The cutout portions 40 and the track grooves 22 are finished by cold-forging ironing using the single ironing punch, thereby being capable of providing uniform products (outer joint members) with high accuracy.

The cutout portions 40 or the connecting portions 61 are each formed into a round shape. Thus, stress concentration on the cutout portions 40 or the connecting portions 61 can be avoided, thereby being capable of effectively preventing damage and the like.

The inlet chamfer 35 of the outer joint member 23, and the track chamfers 36, the track-inlet chamfers 37, and the like of the outer joint member 23 are finished by cold forging, thereby being capable of omitting cutting work, grinding, and the like, which are performed after cold forging in the related art. Thus, a yield can be increased, thereby being capable of reducing manufacturing cost of the fixed type constant velocity universal joint.

In particular, the track grooves 22 and the track-inlet chamfers 37 of the outer joint member 23 are formed by simultaneous cold-forging finishing, or the track grooves 22 and the track chamfers 36 of the outer joint member are formed by simultaneous cold-forging finishing. In this manner, productivity can be increased.

It is only necessary that the number of the torque transmitting balls be equal to or smaller than ten. Thus, a degree of design freedom is high, and excellent design flexibility is attained. Further, the present invention is applicable to a variety of fixed type constant velocity universal joints.

The embodiment of the present invention is described above. The present invention is not limited to the above-mentioned embodiment, but may be modified in various ways. Any one of or all of the cup-inlet chamfer 35, the track chamfers 36, and the track-inlet chamfers 37 may be omitted.

INDUSTRIAL APPLICABILITY

The fixed type constant velocity universal joint according to the present invention is applicable to, for example, a front drive shaft, a rear drive shaft, and a propeller shaft of an automobile.

REFERENCE SIGNS LIST 21 radially inner surface
22 track groove
23 outer joint member
23a cup section
24 radially outer surface
25 track groove
26 inner joint member
27 ball
28 cage
29 pocket (window portion)
35 cup-inlet chamfer
36 track chamfer
37 track-inlet chamfer
40 cutout portion
60 connecting portion

The invention claimed is:

1. A fixed type constant velocity universal joint, comprising:
   an outer joint member comprising a cup section having a plurality of track grooves formed in a radially inner surface thereof;
   an inner joint member having a plurality of track grooves formed in a radially outer surface thereof;
   a plurality of torque transmitting balls, which are interposed between the plurality of track grooves of the outer joint member and the plurality of track grooves of the inner joint member, and are configured to transmit torque therebetween; and
   a cage, which is interposed between the radially inner surface of the outer joint member and the radially outer surface of the inner joint member, the cage comprising pockets configured to retain the plurality of torque transmitting balls therein,
   the outer joint member further comprising a cutout portion that is formed at least at each corner portion on an opening side of the cup section, which is defined between a radially inner opening end portion of each of the plurality of track grooves and a radially inner spherical surface portion formed between the plurality of track grooves, the cutout portion being configured to prevent the cage from interfering with the outer joint member when the cage is incorporated into the outer joint member, and
   in a forging state of the outer joint member, the cutout portions and the plurality of track grooves of the outer joint member are cold-forging ironing finished using a single ironing punch.

2. The fixed type constant velocity universal joint according to claim 1, wherein the cutout portions are formed into a round shape.

3. The fixed type constant velocity universal joint according to claim 2, further comprising connecting portions formed between the cutout portions and the track grooves,
wherein the connecting portions are formed into a round shape.

4. The fixed type constant velocity universal joint according to claim 2, further comprising:
a cup-inlet chamfer formed along an entire periphery of an opening portion of the cup section; and
a track-inlet chamfer formed at a boundary portion between each of the plurality of track grooves and the cup-inlet chamfer,
wherein the plurality of track grooves and the track-inlet chamfers are formed by cold-forging finishing.

5. The fixed type constant velocity universal joint according to claim 1, further comprising connecting portions formed between the cutout portions and the track grooves,
wherein the connecting portions are formed into a round shape.

6. The fixed type constant velocity universal joint according to claim 5, further comprising a track chamfer formed at a boundary portion between each of the plurality of track grooves and the radially inner spherical surface portion formed between the plurality of track grooves of the outer joint member,
wherein the track chamfers and the track grooves are continuously formed through intermediation of the connecting portions having the round shape.

7. The fixed type constant velocity universal joint according to claim 6, further comprising:
a cup-inlet chamfer formed along an entire periphery of an opening portion of the cup section; and
a track-inlet chamfer formed at a boundary portion between each of the plurality of track grooves and the cup-inlet chamfer,
wherein the cup-inlet chamfer and the track-inlet chamfers are formed by cold-forging finishing.

8. The fixed type constant velocity universal joint according to claim 5, further comprising:
a cup-inlet chamfer formed along an entire periphery of an opening portion of the cup section; and
a track-inlet chamfer formed at a boundary portion between each of the plurality of track grooves and the cup-inlet chamfer,
wherein the cup-inlet chamfer and the track-inlet chamfers are formed by cold-forging finishing.

9. The fixed type constant velocity universal joint according to claim 5, further comprising:
a cup-inlet chamfer formed along an entire periphery of an opening portion of the cup section; and
a track-inlet chamfer formed at a boundary portion between each of the plurality of track grooves and the cup-inlet chamfer,
wherein the plurality of track grooves and the track-inlet chamfers are formed by cold-forging finishing.

10. The fixed type constant velocity universal joint according to claim 1, wherein the fixed type constant velocity universal joint comprises a fixed type undercut-free constant velocity universal joint, in which a bottom surface of each of the plurality of track grooves of the outer joint member and a bottom surface of each of the plurality of track grooves of the inner joint member each comprise a circular-arc portion and a straight portion.

* * * * *